United States Patent [19]

Ascenzo

[11] Patent Number: 5,004,075
[45] Date of Patent: Apr. 2, 1991

[54] LIFTING DEVICE FOR OBJECTS

[76] Inventor: Anthony Ascenzo, 70 Commercial St., Boston, Mass. 02109

[21] Appl. No.: 400,505

[22] Filed: Aug. 30, 1989

[51] Int. Cl.$^5$ .............................................. B60S 13/00
[52] U.S. Cl. .................................. 187/8.41; 187/8.67; 187/8.71; 187/8.75; 414/917
[58] Field of Search .................... 187/8.41, 8.47, 8.49, 187/8.5, 8.59, 8.64, 8.65, 8.67, 8.71, 8.74, 8.75; 254/8 R, 89 H; 414/495, 917

[56] References Cited

U.S. PATENT DOCUMENTS

| | | | |
|---|---|---|---|
| 2,958,395 | 11/1960 | Wallace | 187/8.74 |
| 3,346,131 | 10/1967 | Lundell | 414/495 X |
| 3,420,187 | 1/1969 | Johnson et al. | 187/8.41 |
| 3,433,447 | 3/1969 | Carroll | 254/89 H |
| 4,599,033 | 7/1986 | Raz | 414/917 X |
| 4,772,172 | 9/1988 | Rosen | 187/8.71 X |
| 4,845,974 | 7/1989 | Bergstrom | 187/9.41 X |

FOREIGN PATENT DOCUMENTS 649176 8/1937 Fed. Rep. of Germany .

Primary Examiner—Joseph E. Valenza
Assistant Examiner—Dean A. Reichard
Attorney, Agent, or Firm—Owen J. Meegan

[57] ABSTRACT

The present invention relates to a mobile lift or jack for elevating an object, especially an automobile, entirely from the floor. The lift is adapted engage the object from its side. It includes a base which comprises a power section and a floor stand. The floor stand is horizontally disposed and the power section includes a pair of upstanding braces. One end of the brace is attached to and extends upwardly from the base. The lift further includes a carriage with central support beams for holding the object. A main structural arm is disposed between the brace and the central support beams. One end of the main structural arm is pivotably attached to the central support beam at about the middle thereof and the other end of the connector arm is pivotably attached to the brace. Support arms are disposed between the central support beams and the brace. One end of the support arm is pivotably attached at a location distant from the middle of the central support beam and the other end is pivotably attached to the brace, whereby rotation of the carriage around the pivot between the brace and the central support beam is limited and the central support beam can be maintained on a horizontal plane. A hydraulic power supply disposed in the power section is used to lift the carriage by urging a piston rod against the main structural arm so that upon actuation of the power supply, the carriage can be elevated. The parallel beams are secured together by adjustable lateral support beams.

20 Claims, 3 Drawing Sheets

LIFTING DEVICE FOR OBJECTS

BACKGROUND OF THE INVENTION

The present invention relates to mechanical jacks or lifts for automobiles and the like and especially for hydraulically powered lifts or jacks that are arranged to enter engagement with an object to be lifted from a location normal to the object's longitudinal axis, that is from its side rather than from its front or rear. The lift or jack of the present, invention is designed so that when it elevates the object, the object can be lifted entirely from the ground whereby it can be moved to the front, the rear, sideways, etc. on the lift thereby enabling easy movement of the object anywhere on the floor. Side access and movability are extremely important and when an automobile is disposed on the lift of the present invention, all four wheels can be removed from the ground at the same time to enable such movement in a small shop or to provide for sideways movement from bays that are side by side within a small shop.

DESCRIPTION OF THE PRIOR ART

Mechanical jacks to lift automobiles are well known to the art. Such devices are commonly used in gas stations, garages and auto body shops to enable a mechanic to work beneath the vehicle or on its tires or wheels or to reach underneath areas of the automobile for painting.

Exemplary of such prior art is the U.S. Pat. No. 3,433,447. The disclosure relates to a dolly for stabilizing a hoist for lifting parts from an engine vehicle compartment. The hoist is arranged to engage the front or the rear of an automobile and to lift either the front wheels or the rear wheels from the floor while the other two wheels are on the floor.

The U.S. patent to Arzouman, Re. 32,715, relates to a jacking system utilizing a plurality of jack stands in selected locations beneath the vehicle. A power unit controls the jack stands so that each jack stand is vertically extended and then locked into its extended position.

The U.S. Pat. No. 2,891,765, to Pearne, relates to a hydraulic jack for lifting large objects in which a pair of pistons are used to counterbalance forces and provide an equalized lift. The Neilsen patent, U.S. Pat. No. 3,844,421, relates to a hydraulic lift that has a base area which is approximately of the same magnitude as the longitudinal distance between the vehicle's axles but less than the total distance between the vehicle's wheels. The jack system of Nielson is especially adapted to tilt automobiles during work.

The De Paoli patent, U.S. Pat. No. 3,102,713, relates to a scissors type jack, especially useful for automobiles which need to be transported while raised. Rothe, U.S. Pat. No. 3,150,784, relates to a platform for lifting automobiles. The device disclosed by patentee is valuable because it can be stored in a small space. Finkbeiner, U.S. Pat. No. 4,798,266, relates to a device in which passenger vehicles can be lifted from the floor. The device includes a pair of pistons that engage lever arms to raise the vehicle. The pistons are cross-bled to balance each other during the lifting to accomplish the task.

DESCRIPTION OF THE PREFERRED EMBODIMENT

Figure 1:
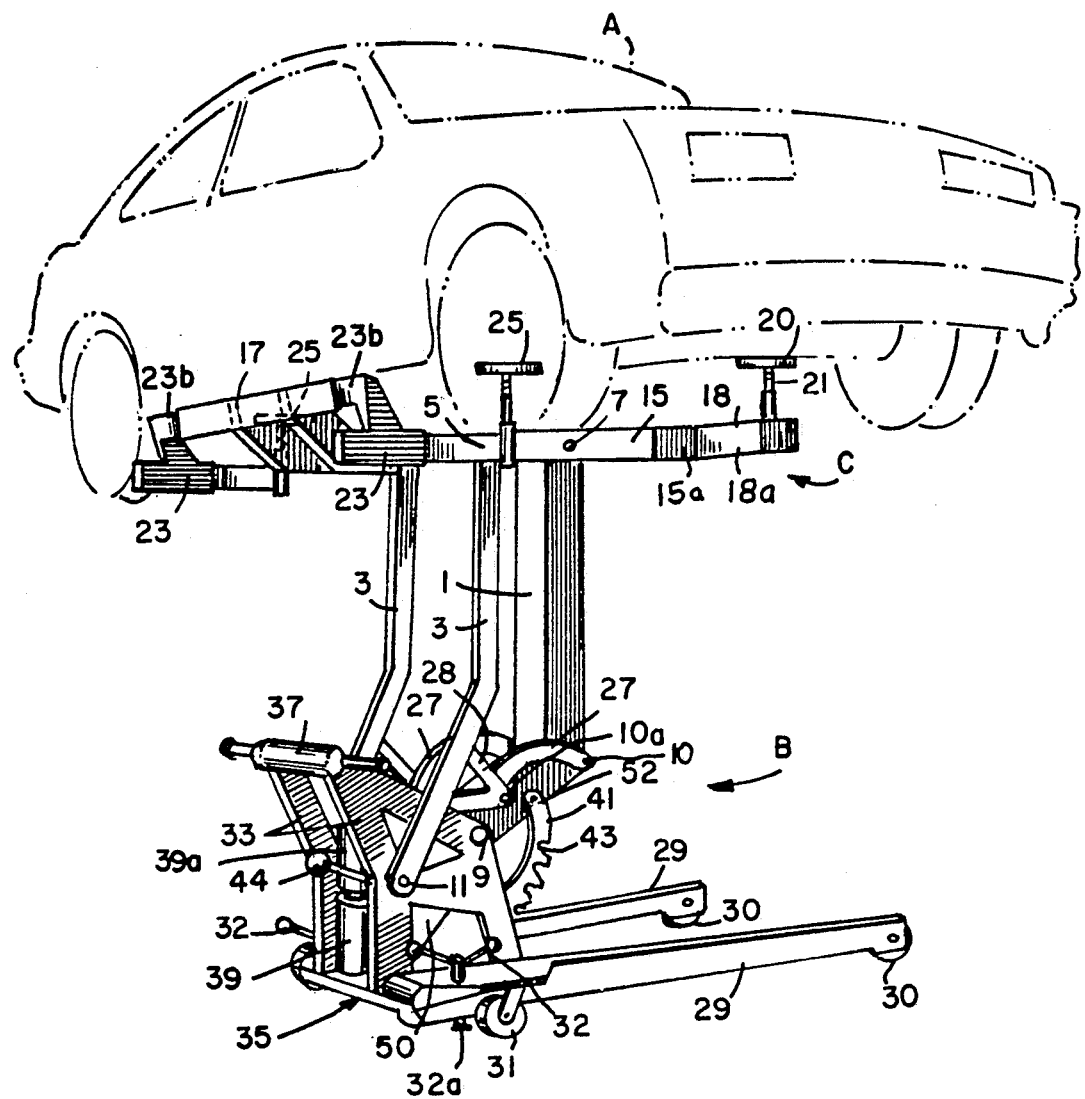
FIG. 1 is an elevational perspective view of the mobile lift according to the present invention.

Referring now to FIG. 1, an automobile A is shown disposed upon a carriage C which is supported by hydraulically actuated arms that are mounted upon a base B.

The carriage C is preferably formed of two spaced-apart central support beams 15 which are arranged so that they can be disposed normal to the longitudinal axis of the object to be lifted. The central support beams 15 are each formed of rectangularly shaped hollow steel and are divided into telescoping sections with male extensions 15a being arranged to slide inside the female sections 15 so that the carriage C can accommodate loads of different widths.

The central support beams 15 are separated from each other by lateral support beams. Preferably, three lateral support beams are used and they are disposed between the central support beams 15. A forward lateral support beam 17 is fixedly disposed at the forward ends of the central support beams 15 and is configured with two adjustable male telescoping arms 23b that can slide back and forth inside the female forward lateral support beam 17 so as to accommodate loads of different lengths.

One of the lateral support beams, viz. the central lateral. support beam, (in the center of the carriage C but not shown in this view) is disposed between the two central support beams 15 to fixedly join them together. A rear lateral support beam 18 is also fixedly disposed between the two extensions 15a of the central support beams 15. The rear lateral support beam 18 is of the same general rectangular shape as the other beams of the carriage C. A male telescoping extension 18a is received by the female rear lateral support beam 18 and is manually adjustable to allow for positioning of the pads at various locations under the object to be lifted.

A pivotable linkage 18b is disposed on extension 18a to allow for the pivoting of pad 20. Preferably, the pad 20 is mounted on a post 21. The post 21 is threaded in a female threaded sleeve so that raising or lowering the post 21 raises or lowers the pad 20 relative to the rear lateral support beam 18. A similar extension and pad is disposed at the other end of the rear lateral support beam 18, although not shown in this view. Each of these pads can be manually adjusted to provide for differences in heights between the bottom of the object to be lifted and the carriage C.

Upward or downward movement of the carriage C is provided by a main structural arm 1 which is pivotably attached at one end to each of the central support beams 15 at a pivot point 7. Pivot point 7 can be formed of conventional bushings which enable the main structural arm 1 to rotate about it.

Main structural arm 1 is preferably formed of a single section of rectangularly shaped steel or in some cases, two parallel arms can be used in its place depending upon weight and strength considerations. The other end of the main structural arm 1 is attached to the base B at pivot point 9. Again, conventional bushings are used to allow for rotation of the main support arm 1 about pivot point 9. A pair of support arms 3 are pivotably attached at their ends to central support beams 15 by conventional bushings at pivot point 5. The other ends of support arms 3 are attached to base B at pivot point 11, again by conventional bushings. Thus, both main structural arm 1 and support arms 3 move in unison about their respective pivot points 9 and 11 and 7 and 5. Support arms 3 prevent carriage C from deviating from a generally horizontal plane and thus provide for horizontal elevation of the load depicted in this view as an automobile A.

A pair of U-shaped support members 27 are fixedly attached to main structural support arm 1 to provide for rigidity in the structure and for a support for the attachment of a hydraulic system as will be described hereinafter. One end of the U-shaped support member 27 is pivotably attached to main structural support arm 1 at pivot point 10 and the other end is pivotably attached to a V-shaped bracket 28 at pivot point 10a. The ends of V-shaped bracket are fixedly attached to support arm 3.

The main structural arm 1 and the support arms 3 are each shaped with a bend disposed on their lengths. As shown in al arm 1 is bent at about a 45° angle about two thirds of way on its length so as to enable the carriage C to rest on the floor and to shorten the displacement of the lifted object from where it was on the floor. The support arms 3 are bent at an angle of about 20° about half way along their length.

The bend enables the carriage C to be disposed flatly upon the floor with minimal height requirements. When the carriage C is disposed upon the floor, the main structural arm 1 will rest upon the floor also, except for the portion adjacent pivot point 9. Similarly with support arms 3, they too will rest upon the floor, except for the portions adjacent pivot points 11.

Base B includes a floor stand formed of legs 29 that extend outwardly from a power section 35. Wheels 30 are mounted at the ends of legs 29 to enable the operator of the lift to move the equipment on the floor. A pair of wheels 31, pivotably disposed in casters, enable the operator to change the direction of movement of the lift. A pair of brakes 32 is disposed on the base B to secure the lift in one position when the operator feels that it is appropriately placed. Operation of the brake 32 is provided by turning a handle which in turn forces a foot 32a of the brake against the floor.

Support for the main structural support arm 1 is provided by a pair of upstanding struts 33 which act as braces. Struts 33 are spaced from each other and their ends are attached to the power section 35. The struts 33 provide support for the pivot points 9 and 11, and also provide a housing for the power mechanism for operation of the lift. A handle 37 is disposed a the top of the struts 33 and joins them together to provide rigidity of their placement and also to enable the operator to move the lift around easily.

Figure 2:
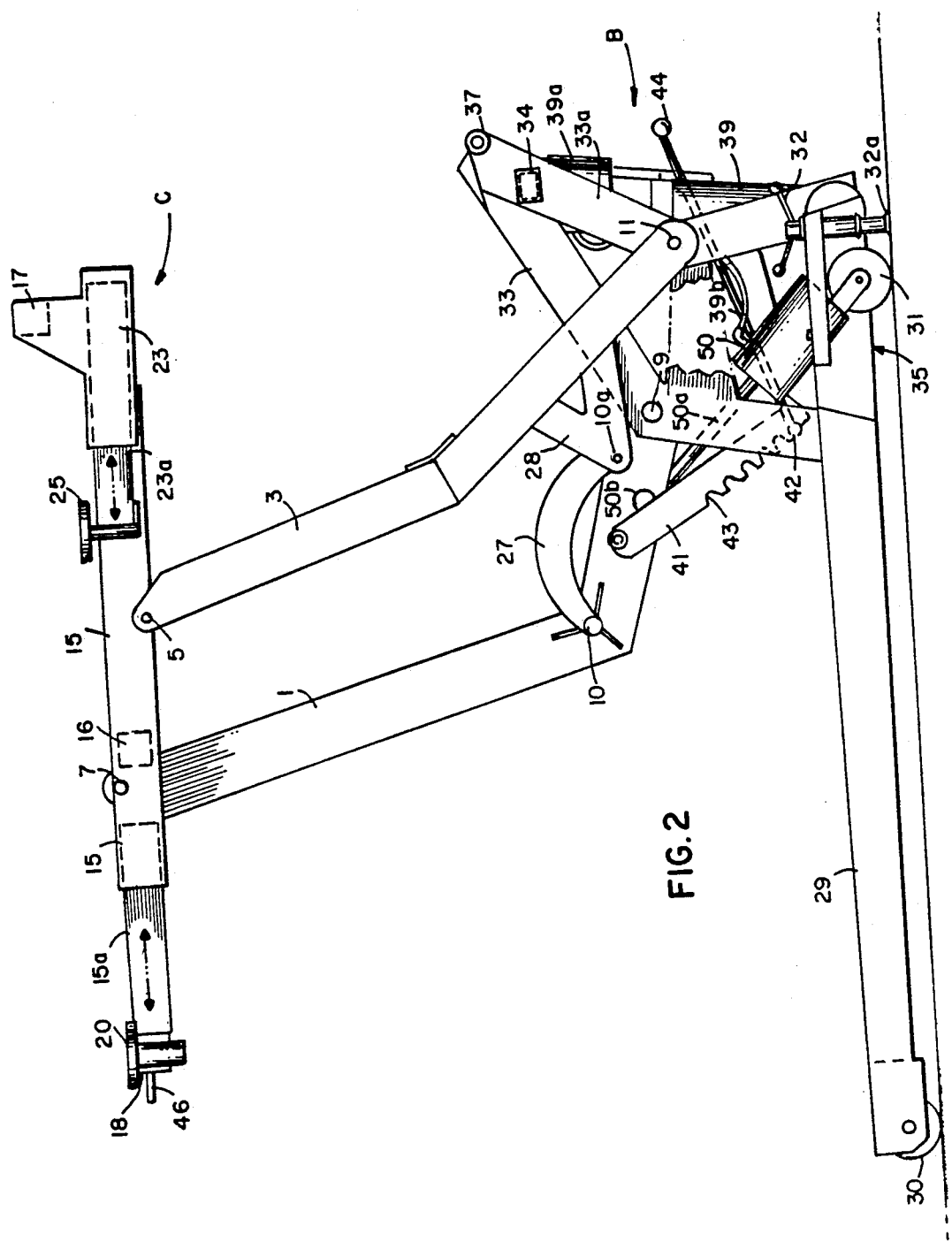
FIG. 2 is a side elevational view of the lift.

The power mechanism for the operation of the lift includes an electrically operated hydraulic pump 39 and a piston 50 operated by it (best shown in FIG. 2). The pump 39 is actuated by pressing a button until the carriage C is lifted to the desired height by pumping hydraulic fluid into the piston cylinder 50 to cause the extension of its associated piston rod (not shown in this Figure). The piston rod urges against the main structural arm 1 at pivot point (not shown in this Figure) to elevate main structural arm 1. The pivot point is formed of a conventional bushing and is disposed on the side of main structural arm 1. A small recess (not shown) is formed in the bottom of main structural arm 1 to receive the piston rod.

A pair of ratchet members 41 (only one of which is shown) is fixedly attached to main structural arm 1 to secure at a fixed height the load being carried even if the hydraulic mechanism 39 were to fail. Teeth 43 on ratchet mechanism 41 engage a pawl (not shown) to secure the position of the carriage C. A handle 44 is attached to the pawl so that when downward movement of the load is desired, the handle is moved to remove the pawl from between the teeth 43 of ratchet 41.

Figure 3:
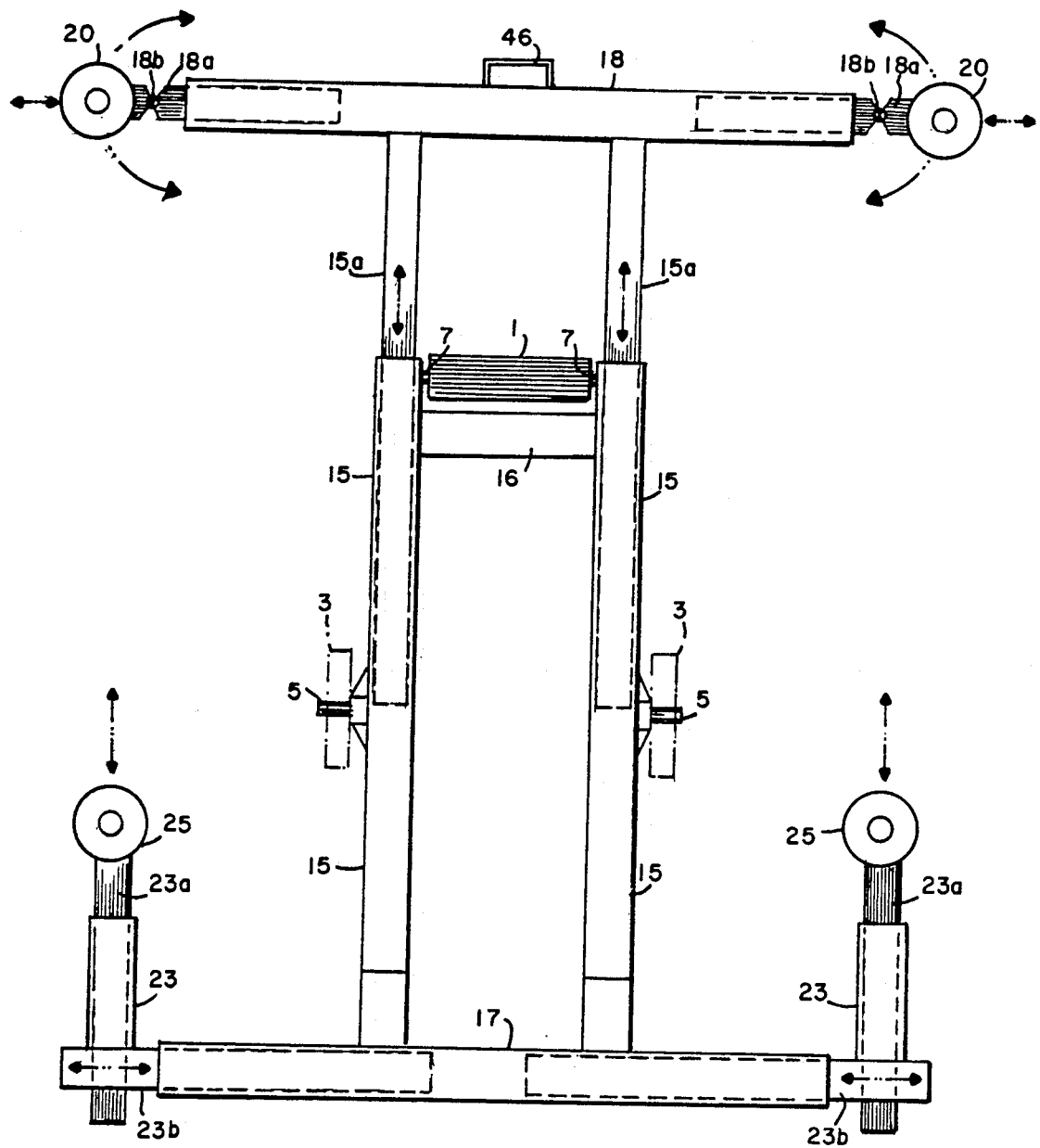
FIG. 3 is a top plan view of the mobile lift shown in FIG. 2.

Referring now to FIGS. 2 and 3, the carriage C can be seen disposed over the base B. As shown, the central support beam 15 is formed in two telescoping sections 15 and 15a. Male section 15a fits inside of the female section 15 and is free to slide so as to adjust the pads 20 for objects of different widths and of different points of contact. A handle 46 is conveniently attached to rear lateral support beam 18 to enable the operator to slide the section 15a inwardly or outwardly within the section 15. A forward lateral support beam 17 is fixedly disposed at the other end of the central support beams 15. Female mounts 23 are fixedly attached to telescoping male extensions 23b by means of hangers. Extensions 23b slidably extend from within forward lateral support beam 17. Extensions 23b are free to move within forward lateral support beam 17, so as to accommodate objects of different lengths. The mounts 23 telescopically hold male secondary arms 23a. Mounts 23 are attached by means of hangers to extension 23b and the attachment is offset by 90° thereto to provide a female telescoping support for secondary arm 23a. The use of the hangers enables the entire carriage A, including the beams 15, the secondary arms 23a and the extension 18a to be disposed on a single plane, e.g. the floor. Pads 25 are attached to secondary arm 23a and can be rotated to provide for changing their height. The central lateral support 16 is fixedly attached to the central support beams 15 at about the middle of their length.

As discussed previously, the carriage C is supported by main structural arm 1 and support arms 3. As arm 1 moves up or down, arm 3 follows and stabilizes it to prevent carriage C from pivoting about point 7. Arms 1 and 3 are also tied together by U-shaped member 27 that is attached to V-shaped bracket 28. U-shaped member 27 pivots around points 10 and 10a, which are a conventional bushings Enhanced linking between the two arms 1 and 3 is provided by the use of the support 27 and bracket 28.

As the carriage C moves upwardly, teeth 43 of the ratchet 41 urge against pawl 42 that indexes into each of the interdental spaces between the teeth 43. Pawl 42 will lodge between teeth 43 to prevent accidental downward movement. When the operator wants carriage C to move downwardly, the handle 44 must be pushed which removes pawl 42 from between the teeth 43 and allows continuous downward movement.

Carriage C is supported on the floor by base B. Base B is formed of the power support 35 that has legs 29 (only one of which is shown) that extend outwardly from it. One wheel 30 is rotatably attached to the distal end of leg 29 and another 31, is on a caster disposed beneath power support 35. The caster wheel 31 is free to rotate to enable the operator to move the lift easily. The brake 32 can be screwed down so that foot 32a engages the floor to prevent unintentional movement of the lift.

A pair of braces 33 (only one of which is shown) extends upwardly from the power support 35. In the preferred embodiment, these braces 33 are each formed of struts 33 and 33a that are each rigidly attached to the power support 35. The pivot points 9 and 11 are disposed on them and allow for the rotation of the arms 1 and 3. The handle 37 joins the struts together at their ends and a cross member 34 joins them at their middle thereby to provide support for the structure.

Elevation of the carriage C is accomplished by actuating pump 39 by means of motor 39a. Pump 39 directs fluid to piston 50 by means of line 39b. When fluid flows into piston 50, piston rod 50a is extended causing the elevation of main support arm 1. Piston rod 50a is connected to main support arm 1 at pivot point 50b, which is a conventional bushing that is disposed inside of the rectangular structure.

It is apparent that modifications and changes can be made within the spirit and scope of the present invention, but it is my intention, however, only to be limited to the scope of the appended claims.

As my invention I claim:

1. A lift device for elevating an object entirely from a surface, said device being adapted to engage the object from its side, said device comprising:
   a base including means for movably supporting said lift device on the surface, said base comprising a power section and a floor stand, said power section including an upstanding brace means, one end of said brace means being attached to and extending upwardly from said base;
   carriage means for holding said object, said means including at least one central support beam and pad means for engaging the object;
   a main structural arm disposed between said brace means and said central support beam, one end of said mean structural arm being attached by a first pivot to said central support beam and the other end of said main structural arm being attached by a second pivot to said brace means;
   at least one support arm disposed between said central support beam and said brace means, one end of said support arm being attached by a third pivot at a location distant from the middle of said central support beam and the other end being attached by a fourth pivot to said brace means, whereby rotation of said carriage around the pivot between said main structure arm and said central support beam is limited and said central support beam can be maintained on a horizontal plane;
   power means to lift said carriage, said power means being pivotably attached to said main structural arm, whereby upon actuation of said power means, said carriage can be elevated.

2. The lift device according to claim 1 wherein said floor stand includes two outwardly extending, substantially horizontally disposed legs, said legs being spaced from each other.

3. The lift device according to claim 2 further including a wheel disposed on each of the legs to support one end of said stand and at least one pivotable wheel disposed adjacent to said power section to support the other end of said stand.

4. The lift device according to claim 1 wherein the brace means is formed of at least two upstanding struts laterally separated from each other.

5. The lift device according to claim 4 wherein each of the struts is formed of two independent members, said members being spaced from each other, the lower ends of said members being fixedly attached to said floor stand and the upper ends being fixedly attached to each other.

6. The lift device according to claim 1 wherein the carriage means includes two parallel beams spaced from each other, said main structural arm being pivotably disposed between said parallel beams, said parallel beams being secured together by a lateral support means.

7. The lift device according to claim 6 wherein said lateral support means comprises an adjustable forward and an adjustable rear beam.

8. The lift device according to claim 7 wherein said lateral support means further includes a fixedly attached central support beam disposed between said parallel beams.

9. The lift device according to claim 6 wherein said lateral support means includes a fixedly attached central support beam disposed between said parallel beams.

10. The lift device according to claim 1 wherein the carriage means includes two parallel beams spaced from each other, said main structural arm being disposed between said parallel beams, said parallel beams being secured together at one end by a forward lateral support beam and at the other end by a rearward lateral support beam and in the middle by a central support beam, said pad means being horizontally and vertically adjustable lifting pads disposed on each of said forward and rearward lateral support beams.

11. The lift device according to claim 6 further including a telescoping adjustable section disposed on each of the rearward ends of said central support beams, said telescoping sections being fixedly held together by a rearward lateral support, said sections being moveable inwardly and outwardly relative to said central support beam so as to provide for objects of different dimensions.

12. The lift device according to claim 6 wherein said central support beams are formed in two sections, one of said sections being a telescoping extension arranged to receive second extension members, said second extension members being disposed normal to said first extension members, the second extension members being movable inwardly and outwardly within the first extension members so as to provide for adjustment on the plate of said parallel beams, said pad means being disposed on said second extension members.

13. The lift device according to claim 6 further including means linking said structural arm to said support arm, and pivot means connecting said linking means to said main structural arm.

14. A lift device for elevating an object entirely from a surface, said device being adapted to approach the object to be lifted perpendicularly to its longitudinal axis, said device comprising:
   a base including means for movably supporting said lift device on a surface, said base comprising a power section and a floor stand, said floor stand being substantially horizontally disposed and comprising legs extending therefrom, said power section including a pair of spaced-apart struts, the ends of said struts being attached to and extending upwardly from said base and disposed adjacent said power section;

carriage means for holding said object including a pair of substantially parallel spaced-apart central support beams, said central support beams being arranged on a plane substantially parallel to said legs;

means on the ends of said central support beams to accommodate objects of different dimensions;

a main structural arm disposed between said struts and said central support beams, one end of said main structural arm being pivotably attached to said central support beams and the other end being pivotably attached at pivot points between said struts;

support arm means connected to said lift device at said central support beams and said struts, one end of said support arm means being attached by a pivot distantly from the attachment of said main structural arm to said central support beam, the other end of said support arm being attached by another pivot to said brace means at a point distantly located from the pivots, whereby rotation of said carriage around the pivot between said central support beams and the main structural arm is limited and said carriage can be maintained on a horizontal plane;

means to lift said carriage, said means connecting said power section and main structural arm, opposite ends of said lift means being pivotably attached to said main structural arm and to said power section.

15. The lift device according to claim 14 further including a wheel disposed on each of the legs to support one end of said base and at least one pivotable wheel disposed adjacent to said power section to support the other end of said base.

16. The lift device according to claim 14 wherein each of the struts is formed of two independent members, said members being spaced from each other, the lower ends of said members being fixedly attached to said base and the upper ends being fixedly attached to each other.

17. The lift device according to claim 16 wherein said means to accommodate objects of different dimensions includes a lateral support means comprising an adjustable forward and an adjustable rear lateral support means, said adjustment being provided so that the lift can accommodate objects of different dimensions.

18. The lift device according to claim 17 wherein said lateral support means further includes a fixedly attached central support beam disposed between said parallel beams.

19. The lift device according to claim 14 wherein said parallel support beams are secured together at one end by a forward lateral support beam and at the other end by a rearward lateral support beam and in the middle by a central support beam, said lift device further including pad means comprising horizontally and vertically adjustable lifting pads disposed on each of said forward and rearward lateral support beams.

20. The lift device according to claim 14 further including a telescoping adjustable section disposed on each of the rearward ends of said central support beams, said telescoping sections being fixedly held together by a rearward lateral support, said sections being moveable inwardly and outwardly relative to said central support beams so as to provide for an adjustment to compensate for objects of different dimensions.

* * * * *